United States Patent Office 3,472,843
Patented Oct. 14, 1969

3,472,843
ARYLMETHYLENE DERIVATIVES OF
2,1-BENZISOTHIAZOLINE
Joseph A. Skorcz, Milwaukee, and John T. Suh, Mequon, Wis., assignors to Colgate-Palmolive Company, New York, N.Y., a corporation of Delaware
No Drawing. Continuation-in-part of application Ser. No. 572,000, Aug. 12, 1966. This application Nov. 14, 1967, Ser. No. 683,002
Int. Cl. C07d 91/42, 91/44, 91/10
U.S. Cl. 260—240       6 Claims

ABSTRACT OF THE DISCLOSURE

The compounds are arylmethylene derivatives of 2,1-benzisothiazoline-2,2-dioxides which are useful in the preparation of wood preservatives, mothproofing agents, pickling inhibitors and as pharmaceutical agents, especially antihypertensive agents and central nervous system stimulants. Compounds disclosed are 1-methyl-3-(4-pyridylmethylene)-2,1-benzisothiazoline-2,2-dioxide and 1 - methyl-3-(2-pyridylmethylene)-2,1-benzisothiazoline-2,2-dioxide.

The present application is a continuation-in-part of our copending application Ser. No. 572,000, now abandoned, filed Aug. 12, 1966.

SUMMARY OF THE INVENTION

The present invention relates to novel arylmethylene derivatives of 2-1-benzisothiazoline-2,2-dioxides, methods of preparing such compounds and compositions containing them.

DETAILED DESCRIPTION

The compounds of the present invention may be represented by the following formula:

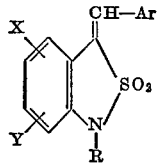

in which X and Y are hydrogen, halogen such as bromo or chloro, lower alkyl such as methyl, ethyl, propyl or butyl, nitro, a lower alkoxy such as methoxy, ethoxy or propoxy, an aralkoxy such as benzyloxy or trifluoromethyl; R is a lower alkyl of 1 to 4 carbon atoms such as methyl, ethyl, isopropyl or butyl, a cycloalkyl of 3 to 7 carbon atoms such as cyclopropyl, cyclobutyl, cyclopentyl or cyclohexyl, an aralkyl of 7 to 15 carbon atoms, especially a phenyl-lower alkyl such as benzyl phenethyl or phenylisopropyl, a cycloalkyl-lower alkyl such as cyclopropyl, methyl, cyclopentyl methyl or cyclohexyl ethyl in which the cycloalkyl has 3 to 7 carbon atoms, phenyl or a nuclear-substituted phenyl, particularly a lower alkoxy-substituted phenyl such as methoxyphenyl; and Ar is an aryl such as phenyl, a nuclear-substituted phenyl, particularly a halo-substituted phenyl such as o-chlorophenyl or m-bromophenyl or a lower alkoxy-substituted phenyl such as methoxyphenyl, or a cycloheteroalkyl, particularly pyridyl.

The compounds of the present invention may be conveniently prepared by employing an unsubstituted haloaniline such as o-chloroaniline or m-bromoaniline, or an N-substituted haloaniline such as N-phenyl-o-chloroaniline, or N-p-methoxyphenyl-m-bromoaniline, as the starting material.

If an unsubstituted haloaniline is employed, it is first treated with methanesulfonyl chloride to form a halomethanesulfonanilide; the sulfonanilide is then treated with an alkyl ester, such as dimethylsulfate, and a base, such as potassium hydroxide, to form an N-substituted-halomethanesulfonanilide, and that compound is then treated with a non-participating strong base, for example, an alkali amide such as sodium amide in an inert reaction medium such as liquid ammonia, anhydrous ether, benzene or the like, to effect the ring closure and form the 1-substituted 2,1-benzisothiazoline-2,2-dioxide, which in turn can be treated with a suitable aromatic aldehyde to form the compounds of the present invention.

The described process may be diagrammed as follows:

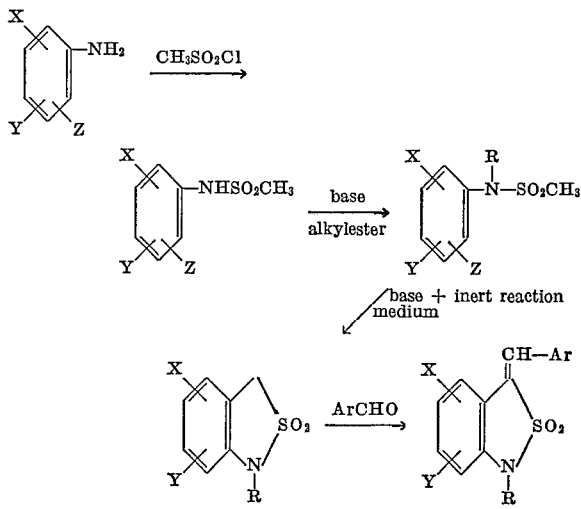

wherein Z is bromo or chloro and X and Y are groups which do not partake in or interfere with the reactions.

If an N-substituted haloaniline is employed as a starting material, it is first treated with methanesulfonyl chloride and the thus formed methanesulfonanilide derivative treated directly with a base in an inert reaction medium to effect the ring closure. The resulting compound is then treated with an aromatic aldehyde as previously described to form the desired compounds.

The described process may be diagrammed as follows:

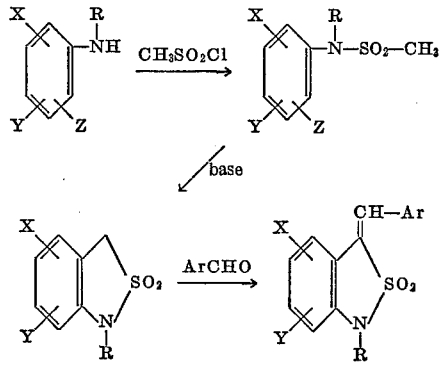

wherein Z is bromo or chloro and X and Y are groups which do not partake in or interfere with the reactions.

A wide variety of arylmethylene-substituted 2,1-benzisothiazoline-2,2-dioxides may be prepared by reacting an equally wide variety of aromatic aldehydes with a 1-substituted-2,1-benzisothiazoline-2,2-dioxide.

Among the aromatic aldehydes which may be employed are the following:

pyridine-4-carboxaldehyde,
pyridine-2-carboxaldehyde,
benzaldehyde, p-methoxybenzaldehyde, and
p-chlorobenzaldehyde.

Representative of the compounds which may be prepared by the previously diagrammed process are the following:

1-methyl-3-(4'-pyridylmethylene)-2,1-benzisothiazoline-2,2-dioxide,
1-methyl-3-(2'-pyridylmethylene)-2,1-benzisothiazoline-2,2-dioxide,
1-methyl-3-benzylidene-2,1-benzisothiazoline-2,2-dioxide,
1-methyl-3-p-methoxybenzylidene-2,1-benzisothiazoline-2,2-dioxide,
1-phenethyl-3-(4'-pyridylmethylene)-2,1-benzisothiazoline-2,2-dioxide, and
1-ethyl-3-(2'-pyridylmethylene)-2,1-benzisothiazoline-2,2-dioxide.

The compounds in which X and Y are other than hydrogen are preferably prepared by using conventional nitration, chlorination and the like techniques to place the ring substituent into the 1-substituted-2,1-benzisothiazoline-2,2-dioxide. For example, chlorine may be inserted into the 5 position by treating a 1-substituted-2,1-benzisothiazoline-2,2-dioxide with N-chlorosuccinimide in dimethyl formamide.

Acid addition salts of the compounds of the present invention may be conveniently produced by contacting the compounds with a suitable acid such as sulfuric acid, hydrochloric acid, succinic acid, tartaric acid, benzoic acid or fumaric acid.

The thiocyanic acid addition salts of the compounds when condensed with formaldehyde form resinous materials useful as pickling agents according to U.S. Patents 2,425,320 and 2,606,155. The compounds also form fluosilicic acid addition salts which are useful as moth proofing agents according to U.S. Patents 1,915,334 and 2,075,359.

The compounds of the invention are pharmacologically active. For example, the compounds 1-methyl-3-(4-pyridylmethylene)-2,1-benzisothiazoline-2,2-dioxide and 1 - methyl - 3 - (2 - pyridylmethylene) - 2,1 - benzisothiazoline-2,2-dioxide, when evaluated in mouse behavioral studies at intraperitoneal doses of 10 to 300 mg./kg. were found to produce behavioral profiles resembling those of known antihypertensive agents. The compounds were also found in the behavioral studies at doses of 10 to 100 mg./kg. to produce a mild central nervous system stimulation in the animals as evidenced by an elevation of reactivity to stimuli, vocalization, pain response, pinnea hyperrefexia and increased startle response. The mouse behavioral studies also indicated that the compounds were relatively safe and possessed $LD_{50}$'s in excess of 400 mg./kg. of body weight. The behavioral studies were conducted essentially in accordance with the procedure outlined by S. Irwin in "Animal and Clinical Pharmacologic Techniques in Drug Evaluation," J. H. Nodine and P. E. Siegler, Ed., Year Book Medical Publishers, Inc., 1964. In the standard anesthetized, vagotomized dog preparation the forementioned compounds were found at intravenous doses of 10 mg./kg. to transiently decrease the blood pressure of the animals 15 to 25%.

When intended for pharmaceutical use, the compounds are preferably combined with one or more suitable pharmaceutical diluents and additives and formed into unit dosage forms for oral or parenteral administration such as tablets, capsules and solutions.

The following examples are presented to illustrate this invention:

EXAMPLE 1 o-Chloromethanesulfonanilide

To a solution of 1.02 kg. (8.0 moles) of o-chloroaniline in 1.2 liters of toluene is added a solution of 448 g. (4.0 moles) of methanesulfonyl chloride in 600 ml. of toluene over a period of 2 hours. The mixture is refluxed for 18 hours, cooled, and filtered. The filtrate is washed with three 500-ml. portions of 10% hydrochloric acid and once with saturated brine solution, dried, and evaporated. Recrystallization of the remaining solid from 2-propanol yields o-chloromethanesulfonanilide, M.P. 87–90°.

EXAMPLE 2

N-methyl-o-chloromethanesulfonanilide

The compound of Example 1 (575 g., 2.8 moles) is added in one portion to a solution of 394 g. (7 moles) of potassium hydroxide in 3.5 liters of water, and the mixture heated to approximately 55°, at which point the sulfonanilide completely dissolves. The heat source is removed, and 710 g. (5.6 moles) of dimethyl sulfate is added dropwise with the temperature kept near 60°. The stirred reaction mixture is heated at 65–70° for 8 hours and then allowed to cool. The product is filtered, washed thoroughly with water, and dried to afford N-methyl-o-chloromethanesulfonanilide in the form of a white, crystalline powder, M.P. 69–72°.

EXAMPLE 3

1-methyl-2,1-benzisothiazoline-2,2-dioxide

To a well-stirred mixture of 39 g. (1.0 mole) of sodium amide in 2 liters of liquid ammonia under nitrogen is added in 10 minutes a solution of 55 g. (0.25 mole) of sulfonanilide II in 300 ml. of dry benzene. After 6 hours, the reaction is quenched by the addition of 40.5 g. (0.75 mole) of solid ammonium chloride, and the ammonia is allowed to evaporate. The residue is treated with water (300 ml.), and the organic material taken up in three 30-ml. portions of benzene, which are combined, extracted three times with 10% hydrochloric acid (300 ml.), washed with saturated brine solution, dried, and evaporated. The solid residue was recrystallized from chloroform-petroleum ether to give 1-methyl-2,1-benzisothiazoline-2,2-dioxide in the form of yellow rods, M.P. 87–91°.

EXAMPLE 4

1-methyl-3-(4-pyridylmethylene)-2,1-benzisothiazoline-2,2-dioxide

A solution of 18.3 g. (0.1 mole) of the compound of Example 3, 16.1 g. (0.15 mole) of freshly distilled pyridine-4-carboxaldehyde, and 0.2 g. of KOH in 250 ml. of absolute ethanol is refluxed for 20 hours, concentrated under vacuum, diluted with water, and extracted with ether. After concentrating the dried ether solution (0.5 liters), the isomer melting at 124–126° precipitates as yellow rods.

*Analysis.*—Calcd. for $C_{14}H_{12}N_2O_2S$: C, 61.75; H, 4.45; S, 11.77. Found: C, 61.53; H, 4.73; S, 12.01.

Evaporation of the filtrate gives a viscous liquid, which is put on a column of alumina (500 g.) with a minimum amount of benzene. Elution with benzene-ether affords an amber oil, followed by a semi-solid which gives an additional amount of the isomer, melting at 124 to 126° after recrystallization from chloroform-petroleum ether.

The initially eluted oil is carefully re-eluted from 350 g. of alumina with benzene-ether (4:1). Two recrystallizations of the resulting yellow solid from benzene-petroleum ether (1:1) provides yellow rods, M.P. 131–132.5°.

*Analysis.*—Calcd. for $C_{14}H_{12}N_2O_2S$: C, 61.75; H, 4.45; S, 11.77. Found: C, 61.36; H, 4.76; S, 11.87.

EXAMPLE 5

1-methyl-3-(4-pyridylmethylene)-2,1-benzisothiazoline-2,2-dioxide methiodide A solution of the lower melting isomer (11 g., 0.04 mole) and 40 ml. of methyl iodide in 150 ml. of chloroform is heated gently for 4 hours, then cooled. The precipitate is filtered and recrystallized from 500 ml. of methanol containing 40 ml. of water. 1-methyl-3-(4-pyridylmethylene) - 2,1-benzisothiazoline-2,2-dioxide methiodide is obtained in the form of brick-red needles, M.P. 240–243°.

*Analysis.*—Calcd. for $C_{15}H_{15}IN_2O_2S$: C, 43.48; H, 3.65; S, 7.74. Found: C, 43.77; H, 3.85; S, 7.73.

EXAMPLE 6

1-methyl-3-(2-pyridylmethylene)-2,1-benzisothiazoline-2,2-dioxide

One tenth mole of the compound of Example 3, 0.15 mole of redistilled pyridine-2-carboxaldehyde, and 0.2 g. of KOH are reacted as in Example 4. The crude product (30 g.) is eluted from 900 g. of alumina with benzene-ether in a number of fractions, which appear to be mixtures of the two possible isomers on the basis of infrared and analytical data. One of the fractions solidifies and is recrystallized from chloroformpetroleum ether to give 1-methyl - 3 - (2 - pyridylmethylene) - 2,1 - benzisothiazoline-2,2-dioxide in the form of yellow needles, M.P. 167–169°.

*Analysis.*—Calcd. for $C_{14}H_{12}N_2O_2S$: C, 61.75; H, 4.45; S, 11.77. Found: C, 61.69; H, 4.63; S, 11.89.

EXAMPLE 7

1-methyl-3-(2-pyridylmethylene)-2,1-benzisothiazoline-2,2-dioxide methiodide

A solution of 13.3 g. (0.049 mole) of the compound of Example 6, as an apparent mixture of isomers, and 50 ml. of methyl iodide in 150 ml. of chloroform is refluxed for 4 hours. Fractional recrystallization of the precipitated solid gives 1-methyl-3-(2-pyridylmethylene) - 2,1 - benzisothiazoline-2,2-dioxide methiodide in the form of an orange powder, M.P. 178–180°.

*Analysis.*—Calcd. for $C_{15}H_{15}IN_2O_2S$: C, 43.48; H, 3.65; N, 6.76. Found: C, 43.49; H, 4.04; N, 6.76.

EXAMPLE 8

1-methyl-3-benzylidene-2,1-benzisothiazoline-2,2-dioxide

The procedure of Example 4 can be repeated using benzaldehyde in place of the pyridine-4-carboxaldehyde to obtain 1 - methyl - 3 - benzylidene - 2,1 - benzisothiazoline-2,2-dioxide.

We claim:

1. A compound selected from compounds and pharmaceutically acceptable salts of compounds of the formula:

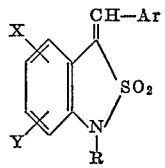

in which X and Y are hydrogen, halogen, lower alkyl, nitro, lower alkoxy, benzyloxy or $CF_3$; R is lower alkyl, cycloalkyl of 3 to 7 carbon atoms, phenyl-lower alkyl of 7 to 15 carbon atoms, cycloalkyl-lower alky in which the cycloalkyl is of 3 to 7 carbon atoms, phenyl or lower-alkoxy phenyl; and Ar is phenyl, halo-substituted phenyl, lower alkoxy-substituted phenyl or pyridyl.

2. A compound of claim 1 in which X and Y are hydrogen or chloro, R is lower alkyl or phenyl, and Ar is phenyl, halo-substituted phenyl, lower alkoxy-substituted phenyl or pyridyl.

3. A compound of claim 1 in which X and Y are hydrogen, R is methyl, and Ar is 2-pyridyl or 4-pyridyl.

4. A compound of claim 1 having the formula

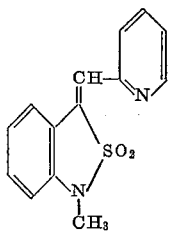

5. A compound of claim 1 having the formula

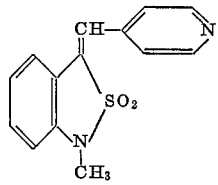

6. A compound of claim 1 selected from the compounds having the formulae

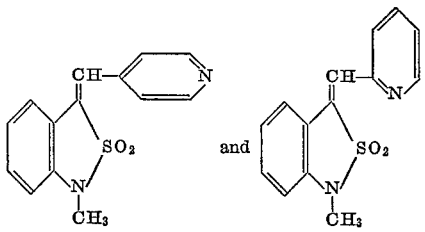

and pharmaceutically acceptable salts thereof.

References Cited

UNITED STATES PATENTS

| | | | |
|---|---|---|---|
| 2,449,244 | 9/1948 | Mueller et al. | 260—240 XR |
| 2,798,067 | 7/1957 | Sawdey | 260—240 XR |
| 2,949,464 | 8/1960 | Strube | 260—240 |
| 3,321,470 | 5/1967 | Howell et al. | 260—240 |

OTHER REFERENCES

Chemical Abstracts vol. 58, cols. 11351 to 11352 (1963).

JOHN D. RANDOLPH, Primary Examiner

U.S. Cl. X.R.

252—149, 391; 260—301, 556, 999